United States Patent [19]

Derner et al.

[11] 4,047,351

[45] Sept. 13, 1977

[54] LIGHT TRANSMITTING PANEL

[75] Inventors: Paul Derner, Gelsenkirchen; Hans Sonntag, Gelsenkirchen-Buer; Otto Stehl, Essen, all of Germany

[73] Assignee: BFG Glassgroup, Paris, France

[21] Appl. No.: 613,852

[22] Filed: Sept. 16, 1975

[30] Foreign Application Priority Data

| Sept. 16, 1974 | Luxembourg | 70915 |
| Sept. 16, 1974 | Luxembourg | 70916 |
| Dec. 27, 1974 | Germany | 2461533 |
| Dec. 27, 1974 | Germany | 2461531 |
| Dec. 27, 1974 | Germany | 2461532 |
| Feb. 1, 1975 | Germany | 2504293 |
| Apr. 4, 1975 | Luxembourg | 72220 |

[51] Int. Cl.² .......................... B32B 1/04; E04C 2/34
[52] U.S. Cl. ........................ 52/616; 52/172; 428/34
[58] Field of Search ............ 52/171, 172, 304, 398, 52/616, 406; 428/34, 38; 181/33 G

[56] References Cited

U.S. PATENT DOCUMENTS

| 2,011,557 | 8/1935 | Anderegg | 428/34 |
| 2,817,124 | 12/1957 | Dybvig | 52/406 |
| 2,885,746 | 5/1959 | Gura | 52/172 |
| 2,939,811 | 6/1960 | Dillon | 52/406 X |
| 3,596,622 | 8/1971 | Moore | 52/2 |
| 3,775,914 | 12/1973 | Patil | 52/616 X |
| 3,783,084 | 1/1974 | Quenett | 52/616 X |
| 3,846,152 | 11/1974 | Franz | 52/616 X |
| 3,868,299 | 2/1975 | Ulish | 52/172 X |
| 3,875,706 | 4/1975 | Okawa | 52/616 X |
| 3,897,580 | 7/1975 | Ingenansson | 428/34 |

Primary Examiner—Alfred C. Perham
Attorney, Agent, or Firm—Spencer & Kaye

[57] ABSTRACT

A light transmitting panel composed of at least two panes held in spaced relation by a spacer assembly to define at least one space between panes is given improved sound damping properties by employing panes which exhibit at least two different masses per unit surface area, by causing the space between panes to be sealed from the external atmosphere, and by filling this space with a gaseous medium whose composition is such that the velocity of sound propagation therethrough is different from that in dry air at the same pressure and temperature as the medium.

34 Claims, 10 Drawing Figures

LIGHT TRANSMITTING PANEL

BACKGROUND OF THE INVENTION

The present invention relates to a light transmitting panel of the type composed of at least two panes held in spaced relation by one or more spacer members to define at least one inter-pane space. The invention also relates to a method of manufacturing such a panel. The invention relates in particular to panels having improved acoustic properties and, in addition, improved thermal properties.

The use of large areas of windows and other panels, such as glazed partitions, which is a feature of modern architectural practice, gives rise to the problem of achieving comfortable sound levels in rooms in whose walls the panels are installed, especially in noisy environments. The problem is particularly acute in the cases of windows facing busy roads or near airports, and light transmitting panels having good acoustic insulation properties are required in these cases, as well as in the case of interior partitions such as in sound recording and broadcasting studios.

Light transmitting panels composed of two or more sheets of glass or plastic material held in spaced relation by one or more spacer members such as have been made for use as windows with the object of reducing heat loss from a building also give rise to a loss in sound transmission, i.e. a rise in sound insulation, but this sound transmission loss, is, in general, insufficient for many purposes.

This sound transmission loss can be increased by increasing the width of the or each inter-sheet space, but this gives rise to manufacturing difficulties and increases the cost of the panel: it also involves the use of a larger and therefore heavier and more expensive frame for holding the panel in position.

It has also been proposed to vary the masses of the sheets of the panel and the ratios of the masses of the different sheets, in order to improve the acoustic properties of the panel.

When plotting a graph of sound transmission loss through a given panel against various frequencies of incident audible sound, it will be found that the result is not a straight line and that there are various regions where transmission peaks occur.

One such transmission peak occurs at fairly high audible frequencies and is due to the so-called coincidence effect. The frequency of the sound waves giving rise to the coincidence effect at a given sheet depends upon the angle of incidence of such waves on the sheet and corresponds to the frequency at which the projected incident wavelength on the sheet is equal to the wavelength of free bending waves in the sheet. Thus the lowest sound frequency at which coincidence takes place, the critical frequency, is that which corresponds to a sound wavelength equal to the free bending wavelength. The free bending wavelength of a sheet, according to currently accepted theories, decreases with increasing thickness, i.e. with increasing mass per unit surface area. It is known to reduce the coincidence transmission peak across a multiple glazing unit by making the sheets of different masses, so that the coincidence peak for one sheet falls at a different frequency from that of another sheet.

Another such transmission peak occurs at a fundamental resonance frequency of the panel, and this also depends inter alia on the masses of the sheets. For a single sheet of a given area it has been calculated that the resonance frequency increases with the mass of the sheet. In a multi-sheet panel, the sheet spacing also has an effect on the resonance frequency.

In the median range of audible sound frequencies, that is between the coincidence and resonance transmission peaks, the sound transmission loss increases with increase in the total mass of the sheets.

Thus it will be seen that in general, although there is an increase in sound transmission loss over this median frequency range when the thicknesses of the sheets are increased, the extent of this frequency range is reduced, and as a consequence of this it is in practice extremely difficult to construct a multiple glazing panel across which the mean sound transmission loss exceeds a given value. By way of example, the mean sound transmission loss across a known double glazing unit will not in general exceed 35 dB.

SUMMARY OF THE INVENTION

It is an object of the present invention to provide a light transmitting panel composed of at least two panes held in spaced relation by one or more spacer members which has improved acoustic properties when compared with a known panel of similar dimensions and which is relatively inexpensive when compared with a known light transmitting panel of similar acoustic properties.

These and other objects of the present invention are achieved in a light transmitting panel composed of at least two panes held in spaced relation by one or more spacer members to define at least one inter-pane space, by employing panes which exhibit at least two different masses per unit area and by providing at least one inter-pane space which is sealed from the atmosphere, and contains a gaseous medium in which the velocity of sound propagation is different from the velocity of sound propagation in dry air at the same pressure and temperature as the medium.

One or each such pane may be a single sheet of material or it may be a laminate, that is, an assembly of two or more sheets bonded together. One or each such sheet may be a plastic sheet, or it may be of vitreous material. The expression "vitreous material" is used herein to denote glass and vitrocrystalline material, the latter being a material which can be made by subjecting a glass to a heat treatment to induce the formation of one or more crystalline phases therein.

It has been found that by making use of the present invention it is possible to construct light transmitting panels which have improved acoustic properties and which are fairly simple and therefore inexpensive to manufacture.

A further and unexpected advantage is also noted. It will be noted that, in comparison with a known air-filled double glazing panel whose sheets have the same mass, a double glazing panel according to the invention has two distinguishable features which affect its acoustic properties. It has rather surprisingly been found that the increase in sound transmission loss due to the combination of these features is greater than the sum of the increases in sound transmission loss due to the features taken individually.

In a particular example, double glazing units having an inter-pane space of 12mm and a total glass thickness of 12mm can be compared with one another. The sound transmission loss may be characterized by a single valve, $R_W$, obtained according to German Standard VDI 2719.

For a panel in which the panes have identical thickness (6mm) and the space between them is filled with air, it is found that $R_w = 33$ dB. By varying the masses of the panes per unit surface area so that they are 8mm and 4mm thick, respectively, and still filling the inter-pane space with air, $R_w$ can be increased to 35 dB. By filling the inter-space with a gaseous medium in which the velocity of sound propagation differs from that in air, but using panes each 6mm thick, it is also possible to increase $R_w$ to 35 dB. Thus each of these distinguishable features gives an increase in sound transmission loss of 2 dB.

By combining these features, i.e. filling the space between two panes 8mm and 4mm thick with the same gaseous medium as mentioned above it is found that $R_w$ is not 37 dB, as might be expected, but is increased even further to 41 dB, an increase of 8 dB over a symmetrical air-filled panel of the same total glass mass.

The difference between the expected sound transmission loss (e.g. 37 dB) and the actual sound transmission loss (e.g. 41 dB) due to this synergistic effect is greater for double glazing panels in which the mass ratio of the panes, i.e. the ratio between the masses of the two panes, is high, and for the same mass ratio, the synergistic effect is greater when the total mass of the panes is small.

The improvement in sound transmission loss afforded by a panel according to the present invention lies primarily in the range of median sound frequencies, that is to say between the higher or highest resonance frequency, if there is more than one and the lower or lowest critical frequency of coincidence, that is in general the critical frequency of the thicker or thickest pane. Above this lower or lowest critical frequency of coincidence a smaller improvement is still apparent, but above the higher or highest critical frequency of coincidence the sound transmission loss through a panel according to the invention is not appreciably different from that through a similarly dimensioned air-filled panel. Since this higher or highest critical frequency of coincidence is often in practice close to the limit of the sound frequency range to be considered in building practice, this is not considered important.

Furthermore, it has in general been found that the frequency at which a resonance transmission peak occurs in a panel according to the invention is lower than the corresponding frequency for a similarly dimensioned air-filled panel.

Preferably, a panel according to the invention includes an inter-pane space which is at least 9mm wide, since increasing the inter-pane space is found to have a beneficial effect on sound transmission loss through a panel. It has been found that satisfactory sound transmission loss through a panel according to the invention can be achieved with a maximum interpane spacing of less than 25mm, and this facilitates framing.

In certain highly advantageous embodiments of the invention, the velocity of sound propagation in the gaseous medium is higher than the velocity of sound propagation in dry air at the same pressure and temperature. In addition to the advantages referred to above, embodiments having this feature have the advantage that the resonance transmission peaks are reduced so that an improved sound transmission loss is afforded at those frequencies.

Preferably, the gaseous medium is composed of at least one gas selected from among helium (He), neon (Ne), methane ($CH_4$) and hydrogen ($H_2$). Such gases may be used alone or mixed with each other or other gases, and they have been found to give especially good results in panels according to the invention. Other gases may also be used and preference is given to mono- or di-atomic gases. Hydrogen in particular will give good results. A mixture of 80 to 58% He, the balance being $CH_4$, forms a very efficacious gaseous medium.

Advantageously, the velocity of sound propagation in the gaseous medium is at least 1.2 times the velocity of sound propagation in dry air at the same pressure and temperature. It may even be as high as 2.5 times the velocity of sound propagation in dry air, or even higher. Gaseous media having this property have been found particularly suitable.

Preferably, the gaseous medium is in part made up of a gas mixture which is, or equivalent in composition to, air. Gas mixture equivalent in composition to air means a man-made mixture having essentially the same composition as air, or the same composition as the principal elements of air.

It has been found that even quite high proportions of air in the gaseous medium can still enable good results to be achieved, and this is particularly important for practical considerations. Firstly, the quantity of the other gas required for a given unit is reduced, and secondly, since multi-pane panels are normally assembled in the atmosphere, the inter-pane space will initially be air-filled, and the complete replacement of that air would involve a long and costly process which it would of course be desirable to avoid.

Furthermore, the inclusion of a proportion of air in the gaseous medium provides a further parameter which can be acted on according to the circumstances of use of such a panel and/or according to its structure. Also, pure gases in which the velocity of sound propagation is higher than in air do, in general, tend to reduce the thermal insulation properties of the panel in which they are sealed. This is usually unimportant when the panel is to be used as an interior partition, but may be of considerable importance in the case of exterior windows, particularly those to be used in cold climates. The inclusion of a proportion of air in the gaseous medium reduces this possibly undesirable adverse effect on the thermal properties of the panel.

In other highly advantageous embodiments of the invention, use if made of a gaseous medium in which the velocity of sound propagation is lower than it is in dry air at the same pressure and temperature. The adoption of this feature also has its advantages. The use of such gaseous media is in general easier than the use of gaseous media in which the velocity of sound propagation is higher than the air, in that it is much easier to seal gaseous media in which the velocity of sound propagation is low in an inter-pane space. These gases do not readily diffuse out of a sealed inter-pane space, as less dense gases may, so less stringent precautions need to be taken in order to ensure the integrity and effectiveness of the panel over a given period of time. Another advantage of adopting this feature is that such gaseous media, as a general rule, confer improved thermal insulation properties on such a panel, and this therefore allows construction of a panel which provides extremely effective acoustic and thermal insulation. Furthermore, it has been found that the synergistic effect referred to above is greater for gaseous media in which the velocity of sound propagation is lower than in air than it is for gaseous media in which the velocity of sound propagation is higher. However, it is to be noted that in addition to the displacement of the resonance transmission peak frequency towards a lower value, the adoption of this feature does have the effect of augmenting the resonance transmission peak, that is, the sound transmission loss is reduced at resonance frequencies. This is in most cases of little practical importance, since these frequencies are still reduced to a range to which most listeners are comparatively insensitive.

Preferably, the velocity of sound propagation in the gaseous medium is between 30% and 95% of the velocity of sound propagation in dry air at the same pressure and temperature, and optimally the velocity of sound propagation in the gaseous medium is between 35% and 75% of the velocity of sound propagation in dry air at the same pressure and temperature. It has been found that the use of gaseous media having these properties gives particularly good results in terms of mean sound transmission loss through a panel according to the invention.

Advantageously, the gaseous medium includes sulphur hexafluoride ($SF_6$), since this gas has been found particularly suitable for use in a panel according to the invention.

Other eminently suitable gaseous media for use in a panel according to the invention include at least one gas chosen from among dichlorodifluoromethane (Freon) ($CCl_2F_2$), carbon dioxide ($CO_2$), argon (A), butane ($C_4H_{10}$), nitrous oxide ($N_2O$), chloropentafluoroethane ($C_2ClF_5$). These gases may be used alone or in combination with one another or with other gases; for example a mixture of sulphur hexafluoride and argon can give especially good results.

Many other gases can also be used, in particular gases which are denser than air and contain carbon, sulphur or nitrogen in compound form.

Preferably, the gaseous medium is in part made up of a gas mixture which is constituted by air or is equivalent in composition to air. This can have a very beneficial effect not only on the cost and ease of manufacture of a panel, but also on its acoustic properties. In many cases it is found that for a given panel there is greater sound transmission loss when an inter-pane space is filled with a gaseous medium comprising a mixture of a relatively dense gas such as sulphur hexafluoride and air than when such space is filled with the relatively dense gas alone. In fact it has been found that said gaseous medium can with advantage consist of as much as 95% air, by volume, in certain panels. Manufacture is facilitated if the gaseous medium includes at least 30% air, by volume.

As was stated above, the use in an inter-pane space of a gaseous medium in which the velocity of sound propagation is lower than in air leads to an augmentation of the resonance transmission peak, and while this is often acceptable, it is not always so, particularly if the panel has to meet certain particular standards such as those laid down in ISO/R717. On the other hand, the use of a gaseous medium in which the velocity of sound propagation is higher than in air may have a deleterious effect on the thermal insulation properties of a panel. Accordingly, it is preferred that the gaseous medium be in part made up of a gas or gas mixture in which the velocity of sound propagation is higher than in dry air at the same pressure and temperature, and in part made up of a gas or gas mixture in which the velocity of sound propagation is lower than in dry air at the same pressure and temperature. This has the effect of reducing the resonance transmission peak to an acceptable value, and also has advantages from the point of view of thermal insulation.

As is well known in the field of multiple glazing panels, in order to prevent condensation within an inter-pane space of a panel it is desirable that the gaseous medium contained therein should be dry. It is also desirable when making use of the present invention to ensure that the gaseous medium is chemically stable, particularly when gas mixtures are used; in particular it is desirable to avoid the use of combustible and especially explosive gas mixtures. It is also desirable to avoid the use of highly toxic gaseous media.

The pressure of the gaseous medium in an inter-pane space may conveniently be equal to the atmospheric pressure at the site of manufacture of the panel, since this will clearly simplify panel production, but such pressure may with advantage be varied, especially if the panel is destined for installation at a higher or lower altitude, so that the pressure of the gaseous medium is made equal to the nominal atmospheric pressure at that altitude. However, the invention also includes embodiments in which the pressure of the gaseous medium is quite different from atmospheric pressure and in particular cases in which the inter-pane space is filled with gas at low pressure.

As has been stated above, an important feature of a panel according to the invention is that its panes have at least two different masses per unit surface area. For example in a triple pane panel, two panes could be of identical mass per unit area while the third is heavier or lighter per unit area. Preferably, the panel includes a pane whose mass per unit area is at least 1.2 times as great as the mass per unit area of one other pane of the panel, and optimally the panel includes a pane whose mass per unit area is at least 1.2 times as great as the mass per unit area of each other panel of the panel. The adoption of either of these features has the effect of increasing the synergism referred to above, and also can have a beneficial effect on sound transmission loss in the higher range of frequencies where the phenomenon of coincidence occurs.

For practical reasons it is desirable to limit the difference in thickness of the various panes of a panel according to the invention, and accordingly it is preferred that the heavier or heaviest pane have a mass per unit area at most equal to three times the mass per unit area of the lighter or lightest pane. This facilitates manufacture of the unit. Considering in particular a double unit, it is usually undesirable to have one pane less than say 3mm or 4mm thick as it is otherwise apt to be easily broken, and accordingly the adoption of a higher pane mass ratio would mean that the other pane would be required to be unduly thick.

Particular interest is given to embodiments of the invention in which the panel comprises at least three panes defining, with one or more spacer members, at least two sealed inter-pane spaces, and such spaces contain respectively different gaseous media offering respectively different velocities of sound propagation. For example one such space could contain air. Preferably however, one such space contains a gaseous medium in which the velocity of sound propagation is lower than in dry air at a given pressure and temperature and the or another such space contains a gaseous medium in which the velocity of sound propagation is higher than in dry air at the given pressure and temperature. In this way it is possible to achieve the advantage of reduction of a resonance transmission peak due to the use of a gaseous medium in which the velocity of sound propagation is higher than in air combined with the advantage of increased thermal insulation due to the use of a gaseous medium in which the velocity of sound propagation is lower than in air.

Particular importance is also attached to embodiments of the invention in which the panel includes at least three panes defining, with one or more spacer members, at least two inter-pane spaces which are sealed from the atmosphere and which are of different thicknesses. Embodiments of the invention having this feature have the advantage of being particularly effective at the lower end of the audible frequency range. The inter-pane spaces may for example be intercommunicating, in which case they would of course both be filled with the same gaseous medium, and this would have the effect of eliminating the possibility of the intermediate pane being deflected by pressure difference in the two inter-pane spaces. It is also possible that this may increase transmission over the resonance frequency range.

It has been found that, for example, a triple glazing panel will tend to resonate at frequencies which are governed by the thicknesses of such spaces and of course by the masses of the various panes. By ensuring that these spaces have different thicknesses it is possible to confer two basic resonance frequencies on the panel and this gives an improved mean sound transmission loss in the resonance region over the case where the spaces are of the same thickness and the panel resonates as a unit.

Preferably, the thinner of the spaces contains a gaseous medium in which the velocity of sound propagation is lower than in dry air at the given pressure and temperature and the thicker of such spaces contains a gaseous medium in which the velocity of sound propagation is higher than in dry air at the given pressure and temperature. This increases the beneficial effect on sound transmission loss in the resonance frequency range, and also gives some improvement to the thermal properties of the panel. As has been stated above, gaseous media in which the velocity of sound propagation is lower than in air are advantageous from the point of view of thermal insulation, and this advantage is enhanced if such media are contained in a narrow space in which a steady flow pattern of convection currents cannot easily be established.

Advantageously, the thicker or thickest inter-pane space is at least twice as thick as the or another such space, since this enhances the beneficial effect on sound transmission loss.

Preferably, the, or at least one, inter-space is in communication with a desiccant selected from among calcium sulphate ($CaSO_4$); calcium chloride ($CaCl_2$); calcium hydride ($CaH_2$); diphosphorus pentoxide ($P_2O_5$); and molecular sieves with pores smaller than or equal to 4 A. In order to avoid condensation within a multiple pane panel it is desirable that the gas or gases contained therein should be dry, but it has been found that many gases whose use is envisaged by the present invention tend to interact with conventional desiccating agents such as silica gel. The preferred desiccants do not suffer from this disadvantage.

In preferred embodiments of the invention at least one pane of the panel is a laminate. Although this admittedly adds considerably to the cost of a panel, in certain circumstances this disadvantage is completely outweighed by the increase in sound transmission loss afforded over a very wide range of audible sound frequencies.

Advantageously, at least one pane face which defines a boundary of an inter-pane space carries a metal or oxide coating. Such a coating may be an infrared reflecting coating e.g. of a metal or metal oxide which will increase the thermal insulation afforded by the panel or it may be an anti-reflective coating e.g. of silicon dioxide to increase the light transmitting power of the panel. The latter may be particularly important in the case of triple pane panels, or those having even more panes, since it is quite usual for there to be a light transmission loss of 4% at each gas/glass interface. In the case of a triple panel this would lead to a total light transmission loss of 24%. Such a light transmission loss can be reduced by the use of anti-reflective coatings. Such metal and oxide coatings also have the effect of modifying friction between the gaseous masses in an inter-pane space and the coated pane, and this has been found to modify the mechanical coupling between such gaseous mass and sheet, which in turn imparts a modification to the sound transmission loss.

It has been found that many of the design parameters of a panel according to the invention are interdependent. For example, especially when using gaseous media in which the velocity of sound propagation is lower than it is in air, it has been found desirable that as the total mass of the panes of a panel of a given area is increased, the ratio between the masses of individual panes should also be increased. The dimensions of a panel also affect the optimum choice of gaseous medium, particularly when this is one in which the velocity of sound is lower than in air. In general, for media which are air/gas mixtures it is found that for best results, the greater the mass ratio between panes bounding an inter-pane space, the higher should be the volume proportion of air in the mixture. As such panel increases in width and/or area, it is also believed that the optimum volume proportion of air increases. It is also believed that in a given panel the optimum volume proporation of air depends on the gas or gases with which it is mixed and should increase with increase in density of the other gas(es).

Reference has been made to an optimum volume proportion of air in a gaseous medium in which the velocity of sound propagation is lower than it is in air. The reason for this, as presently understood, is as follows. As a dense gas is introduced into an air-filled inter-pane space of a given panel, the resonance transmission peak is accentuated; but at the same time, the resonance peak frequency is shifted to a lower value, and there is an improved sound transmission loss over the median sound frequencies, i.e. those between the resonance and coincidence frequencies of the panel. However the improvement in sound transmission loss over the median frequencies does not proceed at the same rate as the deterioration at the changing resonance frequency, and there comes a time when further increasing the volume of dense gas in the gas/air mixture no longer gives a net improvement in sound transmission loss.

It is presently believed that there is likewise an optimum value for the proportions of the constituents in a gas/air mixture in which the velocity of sound propagation is higher than in air, but the reasons for this are not clearly understood.

A panel according to the invention may be merely translucent, but is preferably transparent.

A spacer member forming part of a panel according to the invention may be sealed to a pane e.g. a vitreous pane, by soldering, or it may be glued. Certain adhesive materials can constitute additional sound damping means between a spacer member and a pane.

Preferably each pane of a panel according to the invention is a vitreous pane.

The present invention also provides a method of manufacturing a light transmitting panel composed of at least two panes held in spaced relation by one or more spacer members to define at least one inter-pane space, which method includes the steps of selecting a plurality of panes such that the panes exhibit at least two different masses per unit surface area, bringing such panes into spaced face-to-face relation and sealing them to one or more spacer members to maintain such spacing, and causing at least one inter-pane space to be filled with a gaseous medium in which the velocity of sound propagation is different from the velocity of sound propagation in dry air at the same pressure and temperature. This is a very simple, convenient and economic method of manufacturing a light transmitting panel having good acoustic insulating properties.

A method according to the invention preferably incorporates one or more of the following preferred features: the or at least one inter-pane space is filled with a gaseous medium which at least in part consists of one or more gases selected from among helium (He), neon (Ne), methane ($CH_4$), hydrogen ($H_2$); the or at least one inter-pane space is filled with a gaseous medium which at least in part consists of sulphur hexafluoride ($SF_6$); such gaseous medium includes at least 15% by volume of air or equivalent gas; the or at least one inter-pane space is at least 9mm thick; the or at least one inter-pane space is in communication with a desiccant which is selected from among calcium sulphate ($CaSO_4$); calcium chloride ($CaCl_2$); calcium hydride ($CaH_2$) and diphosphorus pentoxide ($P_2O_5$); and molecular sieves with pores smaller or equal to 4 A. The advantages of these preferred features will readily be inferred from the advantages described above with respect to corresponding preferred features of the panel.

BRIEF DESCRIPTION OF THE DRAWINGS

FIG. 4 is a cross-sectional view of a further double glazing panel according to the invention.

DESCRIPTION OF THE PREFERRED EMBODIMENTS

The invention will be described with reference to several specific operative Examples of panels which have been fabricated according to the invention. In the Examples, various tests results are given, and it should be noted that the tests were all performed on panels whose large surfaces measure 1.5m by 2m. In some cases two values are given for the sound transmission loss through a particular panel. These values are $R_w$ obtained according to the German VDI 2719 and $I_a$ measured according to the International Standard ISO/R717. The tests were in all cases carried out with the sound incident on the thicker or thickest pane of the panel as indicated by the arrows shown in FIGS. 1, 4, 5, 6, 7, 9 and 10. Where proportions of gases in gas mixtures are given, these are in all cases proportions by volume. The values of K, coefficient of thermal transmission, are given in Kcal per m² hr per temperature differential in ° C.

Figure 1:
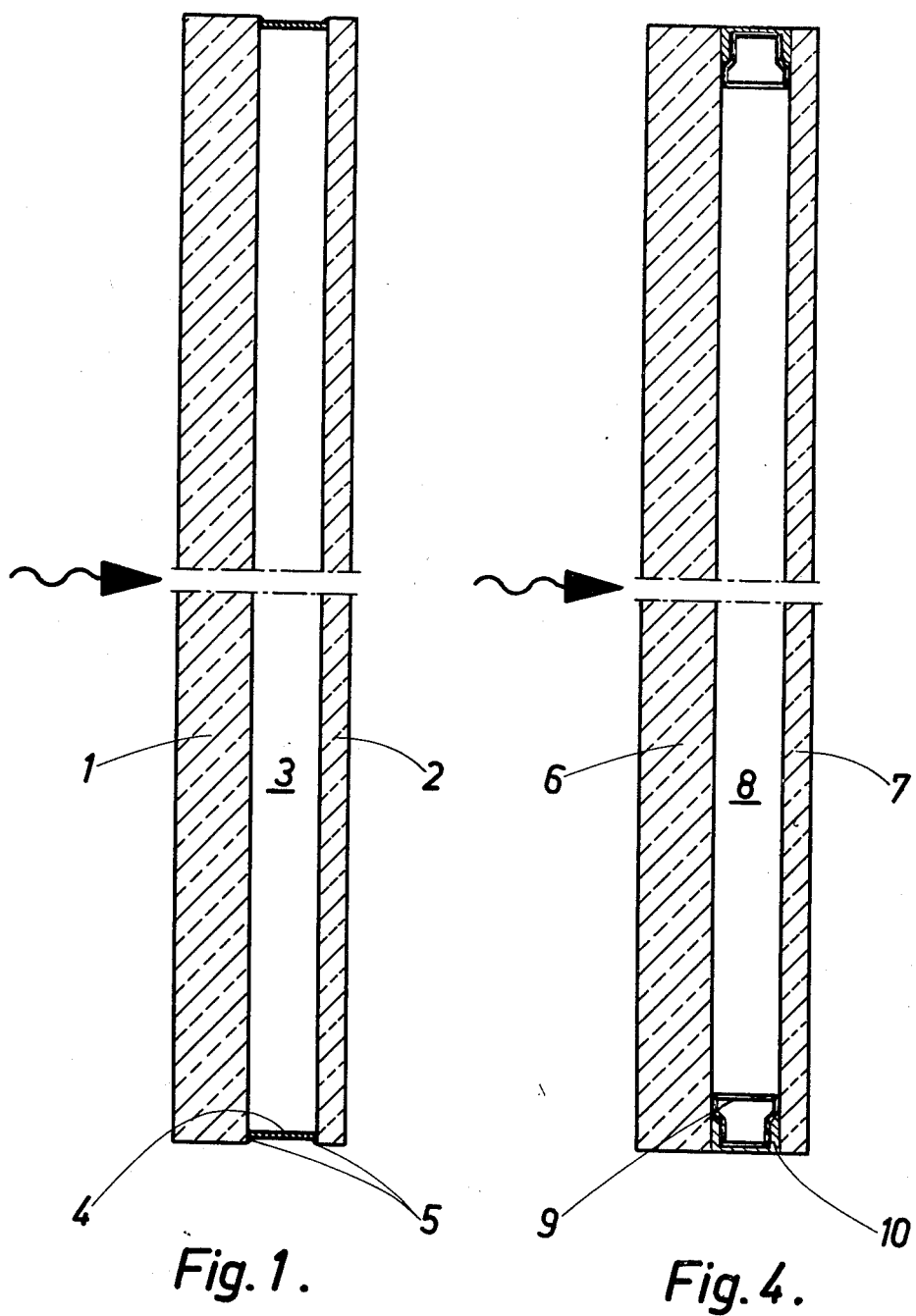
FIG. 1 is a cross-sectional view of a double glazing panel according to the present invention.

FIG. 1 shows a double glazing unit composed of first and second panes 1 and 2 each constituted by a single sheet of glass. The panes are spaced apart and the space 3 between them is sealed by a spacer strip 4 attached to metallized marginal portions of the glass sheets by solder beads 5. After assembly the resulting inter-pane space 3 was flushed with a gas so that such space was filled with a gaseous medium in which the velocity of sound propagation was different from the velocity of sound propagation in air.

Test Panel 1

For comparison purposes of a test panel was produced composed of two panes of glass each 6 mm thick spaced apart by a soldered spacer strip to define an inter-pane space 12 mm thick. This space was filled with air.

The sound transmission loss was found to be $R_w = 33$ dB. Test Panel 2

Test panel 1 was then flushed with sulphur hexafluoride ($SF_6$) until the inter-pane space contained a gaseous medium comprising 25% $SF_6$ and 75% air. The velocity of sound propagation in this gaseous medium (Cg) is 78% of the velocity of sound propagation in air (Ca).

The sound transmission loss was found to be $R_w = 35$ dB.

Test Panel 3

A further test panel was made, as described with reference to FIG. 1, except that the inter-pane space 3 was left filled with air. The first and second panes were respectively 8 mm and 4 mm thick and were of identical composition, giving a pane mass ratio of 2:1 but with the same total pane mass as Test Panels 1 and 2, and the inter-pane space was again 12 mm. The panel had a coefficient of thermal transmission of $K = 2.54$. The resonance transmission peak occurred at a frequency $f_R$ of 200 Hz and the sound transmission loss at that frequency was $L = 22$ dB. The sound transmission loss was found to be $R_w = I_a = 35$ dB.

EXAMPLE 1

A panel was constructed in accordance with FIG. 1 to the same dimensions as Test Panel 3. The inter-pane space was filled with the same gaseous medium as Test Panel 2, namely 25% SF$_6$ and 75% air.

The sound transmission loss was found to be $R_w = 41$ dB.

It will thus be seen that the adoption of either of the features which distinguish Test Panels 2 and 3 from Test Panel 1 gives an improvement in the sound transmission loss $R_w$ of 2 dB, but that by combining these features and constructing the panel of Example 1 according to the invention, there is an improvement in sound transmission loss $R_w$ over Test Panel 1 not of 4 dB as might be expected, but of 8 dB. This is due to the fact that the two features act in synergism.

EXAMPLE 2

A panel was constructed to have the form shown in FIG. 1 and to have the same dimensions as Test Panel 3. The inter-pane space was filled with Freon (CCl$_2$F$_2$). The velocity of sound propagation in this gas (Cg) is 44% of the velocity of sound propagation in air (Ca). The following test results were obtained:

$R_w = 40$ dB; $I_a = 39$ dB; $f_R = 160$Hz; $L = 19$ dB; $K = 2.37$

Thus it will be seen that despite the increase in sound transmission at the resonance peak of the Example 2 panel as compared with Test Panel 3, the panel of Example 2 gives a better overall sound transmission loss and has better thermal insulation properties. It will be noted that the resonance peak frequency was also lower for the panel of Example 2 than for Test Panel 3.

EXAMPLE 3

The pure Freon in the panel of Example 2 was replaced with a mixture of 50% Freon (CCl$_2$F$_2$) and 50% air. The following results were obtained:

$Cg = 59\%$ Ca
$R_w = I_a = 40$ dB
$f_R = 160$Hz
$f_R = 160$Hz
$K = 2.33$

These figures illustrate an improvement in thermal and acoustic insulation even over the panel of Example 2, and this shows that by including a proportion of air in the gaseous medium better results can be achieved than by using a pure gas.

Test Panel 4

An air-filled double glazing panel was made as illustrated in FIG. 1 in which the first and second panes 1 and 2 were of glass 6mm and 4mm thick, respectively, giving a pane mass ratio of 1.5:1, and the interpane space was 12mm thick.

For this panel $R_w = I_a = 33$ dB.

Though K was not measured for this panel it would be greater than the corresponding value of 2.54 for Test Panel 1 in view of the difference in total glass thickness.

EXAMPLE 4

A panel was constructed in accordance with FIG. 1 to the same dimensions as Test Panel 4. The inter-pane space 3 was filled with aqueous medium consisting of 10% Freon (CCl$_2$F$_2$) and 90% air. The following results were observed:

$Cg = 87\%$ Ca
$R_w = I_a = 36$ dB
$f_R = 200$Hz
$L = 18$ dB
$K = 2.51$

It will be noted that this represents an improvement over Test Panel 4 and that there is even a slight improvement over the overall sound transmission loss and thermal insulation afforded by Test Panel 3, despite the greater thickness of glass and greater pane mass ratio of that Test Panel.

Test Panel 5

An air-filled double glazing panel was made as illustrated in FIG. 1. The glass sheets 1 and 2 were, respectively, 8mm and 6mm thick, giving a pane mass ratio of 1.33:1 and a total pane thickness of 14mm. The inter-pane space was 12mm thick.

The sound transmission loss $R_w$ was found to be 35 dB.

EXAMPLE 5

Test Panel 5 then had its inter-pane space filled with SF$_6$. For this gas, $Cg = 39\%$ Ca.

The sound transmission loss $R_w$ was found to be 39 dB.

Test Panel 6

An air-filled double glazing panel was made as illustrated in FIG. 1. The glass sheets were, respectively, 10mm and 4mm thick giving a pane mass ratio of 2.5:1 and the same total pane thickness as Test Panel 5. The inter-pane space was again 12mm thick.

The sound transmission loss $R_w$ was found to be 36 dB.

EXAMPLE 6

Test Panel 6 then had its inter-pane space filled with SF$_6$.

The sound transmission loss $R_w$ was found to be 41 dB.

Comparison of Test Panels 5 and 6 and Examples 5 and 6 shows two interesting features. By increasing the mass ratio of the panes but leaving the total pane mass unaltered, there is an improvement in the sound transmission loss $R_w$. Furthermore, it will be noted that the improvement in sound transmission loss between the panel of Example 6 and air-filled Test Panel 6 is more than that between the panel of Example 5 and air-filled Test Panel 5. This shows that for panels of the same total mass the synergistic effect referred to above is greater as the mass ratio of the panes of the panel increases.

EXAMPLE 7

Three panels were constructed in accordance with FIG. 1 in order to show the effect of an increase in total pane mass on the improvement in sound transmission loss afforded.

In each case the inter-pane space was 12mm thick and was filled with SF$_6$.

Each panel was compared with an otherwise identical but air-filled panel to find the difference in sound transmission loss $\Delta R_w$ afforded.

In the first panel, the panes were 5mm and 4mm thick, respectively, for a total of 9mm and a pane mass ratio of 1.25:1. $\Delta R_w$ was found to be 8 dB.

In the second panel, the panes were 8mm and 6mm thick, respectively, for a total of 14mm and a pane mass ratio of 1.33:1. $\Delta R_w$ was found to be 4 dB.

In the third panel, one pane was a laminate of two 6mm thick glass sheets and the second pane was 9mm thick, for a total of 21mm and a pane mass ratio of 1.33:1. $\Delta R_w$ was found to be 1 dB.

This Example shows that the acoustic benefit afforded by the invention is greater for lighter panels than it is for heavier panels of the same, or even slightly more favorable, pane mass ratio.

Test Panel 7

An air-filled double glazing panel as illustrated in FIG. 1 was made from sheets of glass 1 and 2 respectively 12mm and 4mm thick separated by an inter-pane space of 12mm. The pane mass ratio was 3:1.

The following properties were observed:
$R_w = 37$ dB
$f_R = 250$ to 300Hz
$L = 25$ dB

EXAMPLE 8

A panel was constructed in accordance with FIG. 1 to the same dimensions as Test Panel 7. The inter-pane space was filled with $CCl_2F_2$.

The following properties were observed:
$Cg = 44\%$ Ca
$R_w = 40$ dB
$f_R = 160$Hz
$L = 14$ dB Thus it will be noted that there is an improvement in sound transmission loss $R_w$ despite the increase in sound transmission at the resonance frequency of the panel.

EXAMPLE 9

A panel was constructed in accordance with FIG. 1 to the same dimensions as Test Panel 7 and the panel of Example 8. The inter-pane space was filled with 20% $CCl_2F_2$ and 80% air.

The following properties were observed:
$Cg = 78\%$ Ca
$R_w = 42$ dB
$f_R = 160$Hz
$L = 23$ dB This Example and comparison with Example 8 and Test Panel 7 illustrates the important fact that a mixture of a particular gas and air can confer better acoustic properties on a panel of given dimensions than either the pure gas or pure air. It also points to the fact that the proportion of such gas can be comparatively small, and this has a favorable effect on the cost of the panel.

EXAMPLE 10

An $SF_6$-filled panel was constructed in accordance with FIG. 1 to the same dimensions as Test Panel 7.

The following properties were observed:
$Cg = 39\%$ Ca
$R_w = 41$ dB
$f_R = 160$Hz
$L = 13$ dB There is thus an improvement in the sound transmission loss of 5 dB as compared with Test Panel 7.

EXAMPLE 11

The panel of Example 10 was filled with a gaseous medium constituted by 25% $SF_6$ and 75% air.

The following properties were observed:
$Cg = 78\%$ Ca
$R_w = 42$ dB
$f_R = 160$Hz
$L = 21$ dB Again it will be noted that the inclusion of a proportion of air in the gaseous medium has a favorable effect on sound transmission loss at the resonance frequency as compared with a panel in which the gaseous medium does not contain air.

Figure 2:
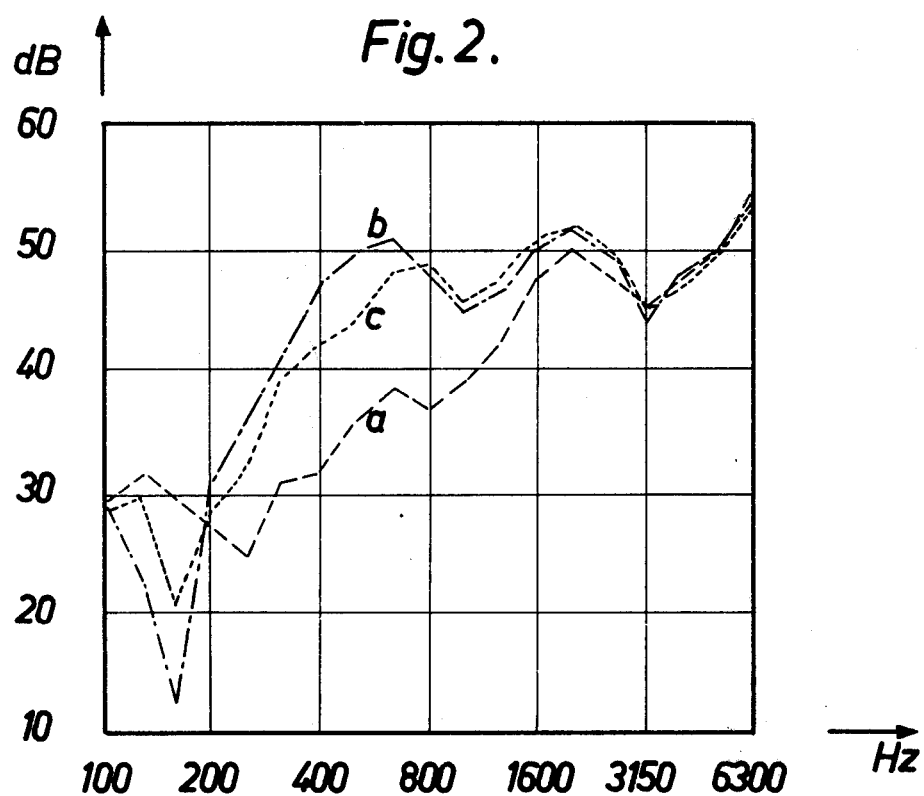
FIG. 2 is a graph of sound transmission loss through double glazing panels plotted against the frequency of incident sound waves.

FIG. 2 is a graph showing sound transmission loss through three double glazing panels over a range of sound frequencies. Curve $a$ corresponds to air-filled Test Panel 7 and curves $b$ and $c$ correspond, respectively, to the panels of Examples 10 and 11.

Curve $a$ shows coincidence transmission peaks at 800Hz and 3150Hz, corresponding to the critical coincidence frequencies for a 12mm sheet and a 4mm sheet, and a resonance transmission peak between 250Hz and 300Hz. At the resonance transmission peak frequency ($f_R$) there is a sound transmission loss (L) of 25 dB.

Curve $b$ shows the sound transmission loss through a panel of the same dimensions but filled with $SF_6$. It will be noted that there is a considerable improvement over the median range of frequencies, and a lesser but still noticeable improvement in the region between the coincidence frequencies. Above the higher coincidence frequency, 3150Hz, there is substantially no difference between curves $a$ and $b$. Curve $b$ shows a resonance transmission peak at a frequency of 160Hz where there is a sound transmission loss of 13 dB. It will be noted that filling the inter-pane space of the panel with $SF_6$ has caused the resonance transmission peak to become sharper and that at frequencies below 200Hz there is in fact a drop in the sound transmission loss afforded. This deterioration at low frequencies is more than balanced by the gain in sound transmission loss over the range of frequencies from 200Hz to the higher critical frequency of coincidence so that there is a net gain in sound transmission loss $R_w$ of 5 dB.

Curve $c$ shows the sound transmission loss through a panel of similar dimensions filled with a gaseous medium consisting of 25% $SF_6$ and 75% air. It will be noted that above the higher critical frequency of coincidence, 3150Hz, there is substantially no difference between curve $c$ and curves $a$ and $b$. Between the critical frequencies of coincidence there is a marginal improvement even over curve $b$, while over the median frequency range curve $c$ shows considerable improvement over curve $a$, but lies below curve $b$. Again it will be noted that the resonance transmission peak has been displaced to a lower frequency (160Hz), but in this case the sound transmission loss at the resonance peak is 21 dB. The sound transmission loss $R_w$ for the panel of curve $c$ is 42 dB giving an improvement over the panel of curve $a$ of 6 dB and over the panel of curve $b$ of 1 dB.

Figure 3:
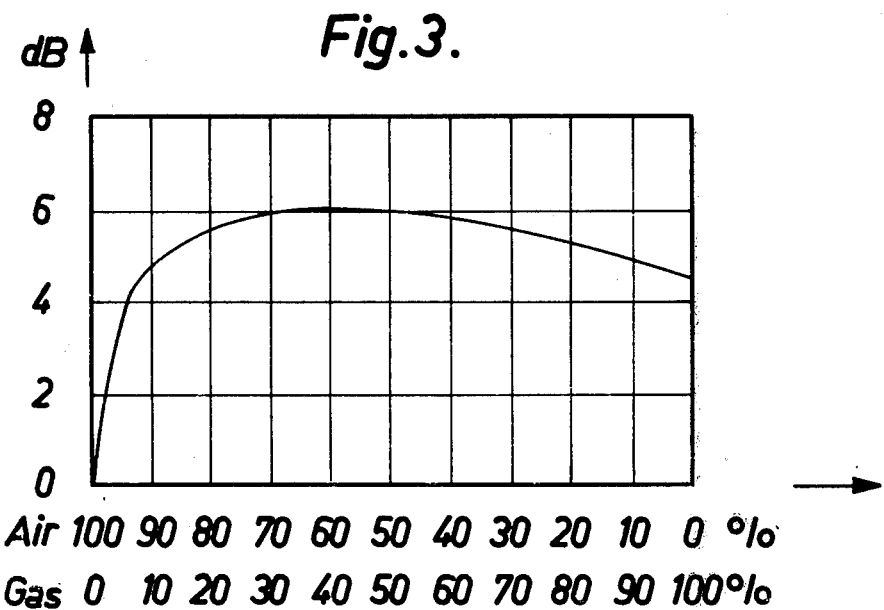
FIG. 3 is a graph showing the variation in mean sound transmission loss through a double glazing panel whose inter-pane space is filled with a gaseous medium plotted against variations in the proportion of air in the medium.

In order to illustrate the effect of changing the volume proportion of air in the gaseous medium within a double glazing panel, reference will now be made to FIG. 3 which is a graph showing the improvement in sound transmission loss $R_w$ plotted against changing proportions of air in a double glazing panel composed of two panes of glass 12mm and 4mm thick, respectively, and spaced apart by 12mm. The panel was initially air-filled, and the air was progressively replaced by an increasing proportion of $SF_6$. It will be noted that the acoustic improvement afforded increases rapidly until the gaseous medium consists of 5% $SF_6$ and 95% air, at which point the curve flattens out to reach a maximum at approximately 40% $SF_6$ and 60% air. It will also be noted that better results can be achieved with 10% $SF_6$ than with 100% $SF_6$ in the gaseous medium in the inter-pane space of the unit. Finally, it will be noted that this graph applies to Test Panel 7 and the panels of Examples 10 and 11.

It has been found when plotting a similar graph for a panel having glass sheets 12mm apart and 6mm and 4mm thick, respectively, that is with a pane mass ratio of 1.5:1 as opposed to 3:1, the maximum sound transmission loss $R_w$ occurs when the gas/air mixture in the inter-pane space contains 60% $SF_6$.

FIG. 4 shows another type of double glazing unit composed of two sheets of glass 6 and 7 with an inter-pane space 8 sealed and maintained by a sheet spacer member 9 glued by an adhesive 10 to the margins of the sheets. The spacer member 9 is of box-like construction, and the adhesive used may be of any suitable known type.

Test Panel 8

An air-filled panel was constructed to have the form shown in FIG. 4. The sheets 6 and 7 were 8mm and 5mm thick, respectively, and the inter-pane space was 12mm thick.

The following properties were observed:
$R_w = 37$ dB
$f_R = 250$ Hz
$L = 24$ dB

EXAMPLE 12

The inter-pane space of Test Panel 8 was filled with $SF_6$.

The following properties were observed:
$R_w = 39$ dB
$f_R = 160$ Hz
$L = 13$ dB Despite the augmentation of the resonance transmission peak a net gain in sound transmission loss $R_w$ of 2 dB was afforded.

EXAMPLE 13

The inter-pane space of Test Panel 8 was filled with 25% $SF_6$ and 75% air.

The following properties were observed:
$R_w = 41$ dB
$f_R = 160$ Hz
$L = 23$ dB
$K = 2.39$ These properties represent an improvement even over the panel of Example 12.

Test Panel 9

The inter-pane space of Test Panel 8 was increased from 12mm to 20mm.

EXAMPLE 14

The inter-pane space of Test Panel 9 was filled with $SF_6$. It was found that:
$R_w = 40$ dB
$f_R = 160$ Hz
$L = 13$ dB

EXAMPLE 15

The inter-pane space of Test Panel 9 was filled with a mixture of 25% $SF_6$ and 75% air. It was found that:
$R_w = 41$ dB
$f_R = 125$ Hz
$L = 19$ dB

Test Panel 10

An air-filled panel was constructed to have the form shown in FIG. 4. The glass sheets 6 and 7 were 9mm and 5mm thick, respectively, and the inter-pane space was 20mm thick.

EXAMPLE 16

Test Panel 10 was filled with a mixture of 90% He and 10% air.

The following properties were observed:
$C_g = 232\%$ Ca; and an increase of sound transmission loss over air-filled Test Panel 10 of
$\Delta R_w = a + 5$ dB It was found that the sound transmission loss afforded by this panel was greater than that afforded by Test Panel 10 even in the range of resonance frequencies. The thermal insulation afforded by the panel of this Example was not as good as that of Test Panel 10 but, as has been stayed, good thermal insulation is not always required of a panal intended for acoustic insulation purposes.

EXAMPLE 17

Test Panel 10 was filled with a mixture of 40% He and 60% air.

The following properties were observed:
$C_g = 127\%$ Ca
$\Delta R_w = +$ dB

Thus the sound transmission loss afforded by this panel was improved with respect to the loss afforded by Test Panel 10, but was not so great as the loss afforded by the panel of Example 16. On the other hand the panel of Example 17 was better than that of Example 16 from the thermal insulation point of view.

From comparison of Examples 16 and 17 it will be apparent that when using a gas mixture in which the velocity of sound propagation is higher than the air, low volume proportions of air in the mixture give a better sound transmission loss than higher proportions, but at the same time reduce the effectiveness of the panel as a thermal insulator.

Test Panel 11

For comparison purposes an air-filled test panel was constructed to have the form shown in FIG. 4, in which sheet 6 was 12mm thick, sheet 7 was 4mm thick and the inter-pane space was 12mm thick.

The following properties were observed:
$R_w = 38$ dB
$I_a = 39$ dB
$f_R = 250$ Hz
$L = 24$ dB
$K = 2.5$

EXAMPLE 18

Test Panel 11 was filled with $SF_6$, and the following properties were observed:
$R_w = 43$ dB
$f_R = 160$ Hz
$L = 14$ dB
$K = 2.46$ Thus the panel of Example 18 gives improved thermal and acoustic insulation over air-filled Test Panel 11.

EXAMPLE 19

Test Panel 11 was filled with a mixture of 25% $SF_6$ and 75% air, and the following results were observed:
$R_w = 44$ dB
$f_R = 160$ Hz
$L = 21$ dB
$K = 2.37$ These figures represent an improvement even over the panel of Example 18.

Furthermore, when comparing Examples 12 and 13, respectively, with Examples 18 and 19 it will be noted that these latter Examples give improved results. This is, at least in part, due to the greater pane mass ratio of these latter Examples.

EXAMPLE 20

Test Panel 11 was filled with helium. The following properties were observed:
$Cg = 290\%$ Ca
$R_w = 46$ dB
$K = 3.5$ It will be seen that this panel gives extremely good results from the acoustic point of view, but at the expense of its thermal insulating properties.

EXAMPLE 21

Test Panel 11 was filled with a mixture of 56% He and 44% air. The following results were observed:
$Cg = 145\%$ Ca; $R_w = 44$ dB; $K = 3.0$ This represents a very acceptable compromise in that a high sound transmission loss is afforded without such a decrease in thermal insulating properties as given by the panel of Example 10.

EXAMPLE 22

Test panel 11 was filled with a mixture composed of between 80% and 85% He, the balance being $CH_4$. This panel was also found to give extremely good sound transmission loss.

EXAMPLE 23

Test panel 11 was filled with a mixture of 95% He and 5% $SF_6$. The following properties were noted:
$Cg = 174\%$ Ca (calculated result); $f_R = 160$Hz; $R_w = I_a = 45$ dB; $L = 31$ dB It will be observed that this panel containing a gaseous medium which is a mixture of two gases, one in which the velocity of sound propagation is higher than in air and one in which such velocity is lower than in air, is particularly ffective at lower audible frequencies. The sound transmission loss at the resonance transmission peak in some 7 dB higher than for the corresponding air-filled Test Panel 11.

EXAMPLE 24

Test Panel 11 was filled with a mixture of 50% Ne and 50% $SF_6$. The following results were noted:
$Cg = 58.5\%$ Ca (calculated); $f_R = 160$Hz; $R_w = I_a = 44$ dB These figures show an improvement in the sound transmission loss $R_w$, over the corresponding air-filled Test Panel 11, of 6 dB.

EXAMPLE 25

Test Panel 11 was filled with neon, and the following properties were observed:
$Cg = 131\%$ Ca
$R_w = I_a = 41$ dB
$f_R = 250$Hz It will be noted that despite the fact that the resonance frequency was unaltered as compared with air-filled Test Panel 11, there was an improvement of 2 or 3 dB in the sound transmission loss afforded, depending on the mesurement method chosen.

EXAMPLE 26

Test Panel 11 was filled with methane ($CH_4$), and the following results were observed:
$Cg = 129\%$ Ca
$R_w = I_a = 40$ dB
$f_R = 250$Hz
$L = 25$ dB There was an improvement in the sound transmission loss afforded by this panel as compared with an air-filled panel of the same dimensions.

EXAMPLE 27

In order to demonstrate the effect of mixing air into the gaseous medium in a panel, Test Panel 11 was filled with a mixture of 50% $CH_4$ and 50% air.

It was found that:
$Cg = 113\%$ Ca (calculated)
$R_w = I_a = 43$ dB
$f_R = 160$Hz This indictes a noticeable improvement over both an air-filled panel of the same dimensions (Test Panel 11) and the methane-filled panel of Examples 26.

EXAMPLE 28

In order to further illustrate the effect of using a mixture of gases, Text Panel 11 was filled with a gaseous medium consisting of 75% $CH_4$ and 25% $SF_6$. The following properties were observed:
$Cg = 73\%$ Ca (calculated)
$R_w = I_a = 44$ dB
$f_R =$ between 160Hz and 200Hz
$L$ greater than 25 dB Clearly this is a very effective sound insulating panel.

EXAMPLE 29

Test Panel 11 was filled with a mixture of 50% $Co_2$ and 50% air. The following properties were observed:
$Cg = 88\%$ Ca (calculated)
$R_w = I_a = 43$ dB
$f_R = 160$Hz
$K = 2.4$ This is another very effective sound insulating panel which also has improved thermal insulation properties.

EXAMPLE 30

Test Panel 11 was filled with argon, with the following results:
$CG = 93\%$ Ca
$R_w = 44$ dB
$I_a = 42$ dB
$f_R = 200$Hz
$L = 23$ dB It will be observed that there is an improvement in mean sound transmission loss over the corresponding air-filled panel.

EXAMPLE 31

Test Panel 11 was filled with a mixture of 75% argon and 25% $SF_6$.

The following results were observed:
$Cg = 69\%$ Ca
$R_w = I_a = 45$ dB
$f_R$ between 160Hz and 200Hz
$L = 28$ dB It will be noted from these results that this is an extremely effective sound insulating panel.

EXAMPLE 32

Test Panel 11 was filled with isobutane, with the following results:

$Cg = 63\%$ Ca
$R_w = I_a = 44$ dB
$f_R = 160$Hz
$L = 25$ dB

These results show that this is another very effective sound insulating panel.

Further embodiments of the invention will now be described with reference to FIG. 5 which shows a double glazing panel composed of a first pane 21 which is a laminate and consists of two glass sheets 22 and 23 bonded together by means of a layer 24 of polyvinyl butyral (PVB). The glass sheets 22 and 23 are each 6mm thick and the PVB layer 24 is 1.14mm thick and was made up of a number of sheets of commercially available PVB film 0.38mm in thickness. The first pane 21 is separated from a second pane 25 which is a single glass pane 4mm thick, by a space 26 which is 12mm in thickness. The inter-pane space is maintained and sealed by means of a spacer strip 27 soldered at 28 to metallized marginal portions of the two panes.

Test Panel 12

Figures 5, 6:
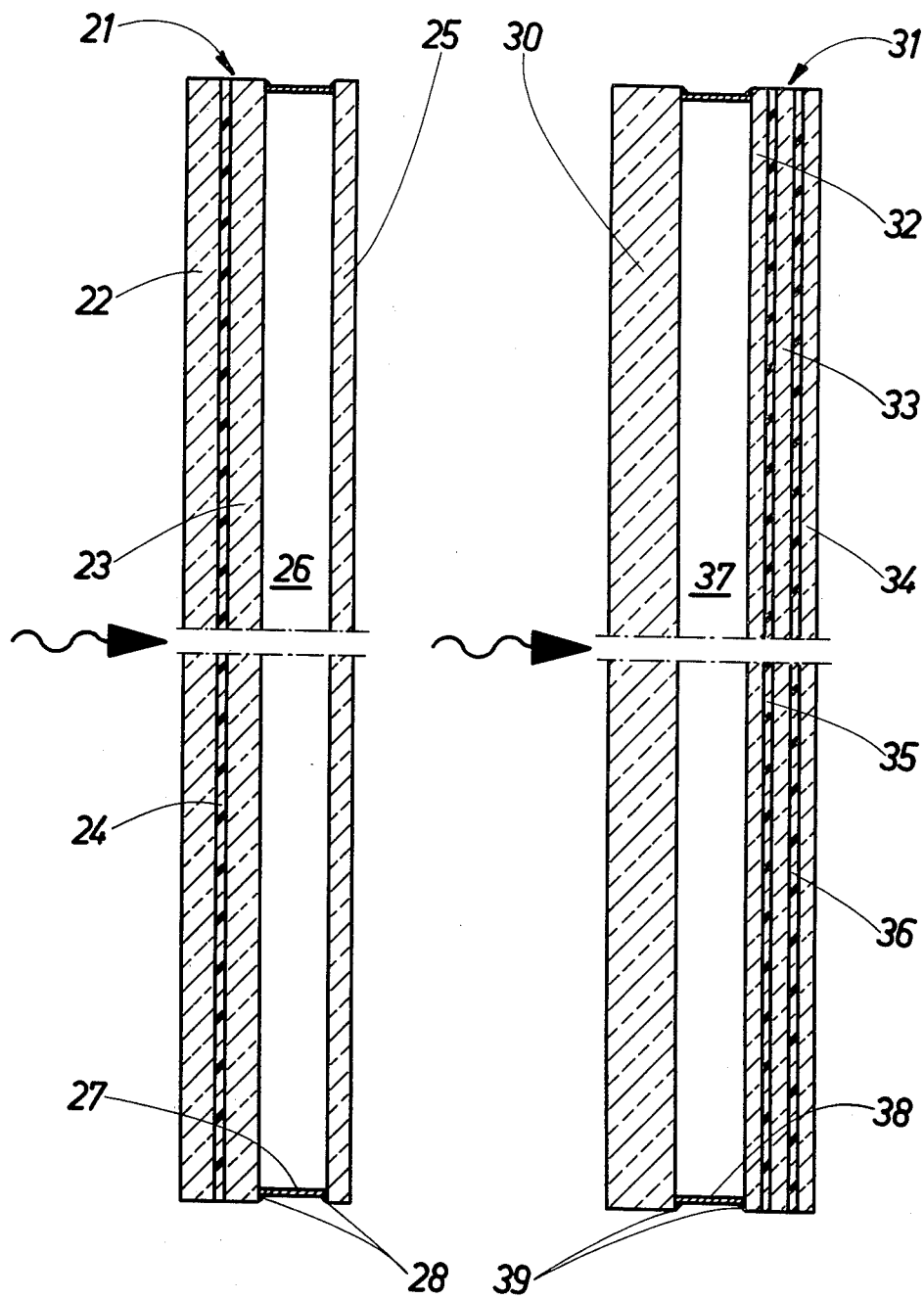
FIGS. 5 and 6 are cross-sectional views of two further double glazing panels which incorporate a laminated pane according to the invention.

An air-filled double glazing panel was constructed in the form shown in FIG. 5. For this panel, $R_w = 39$ dB.

EXAMPLE 33

Test Panel 12 was filled with $CCl_2F_2$, with the following results:

$R_w = 42$ dB
$f_R = 160$Hz
$L = 18$ dB

EXAMPLE 34

Test Panel 12 was filled with a mixture of 50% $CCl_2F_2$ and 50% air. The following results were observed:

$R_w = 44$ dB
$f_R = 160$Hz
$L = 23$ dB

It will thus be noted that it is advantageous to mix a proportion of air in the gaseous medium in a panel of this structure.

Test Panel 13

An air-filled double glazing unit was constructed in the form shown in FIG. 5 except that the inter-pane space was sealed using a glued spacer similar to that described with reference to FIG. 4. The inter-pane space was maintained at 12mm. $R_w$ was found to be 39 dB.

EXAMPLE 35

Test Panel 13 was filled with a mixture of 40% $SF_6$ and 60% air. $R_w$ was found to be 47 dB, showing that this panel affords extremely good sound transmission loss.

Fig. 6

FIG. 6 shows a double glazing panel including a first pane 30 which is a sheet of glass 12mm thick held spaced apart from a second pane 31 constituted by three sheets of glass 32, 33 and 34 each 3mm thick and bonded together using two layers 35 and 36 of PVB each 0.76mm in thickness. The inter-pane space 37 is 12mm and is maintained by a spacer strip 38 joined to metallized marginal portions of the two panes by solder beads 39.

EXAMPLE 36

A panel was constructed in the form shown in FIG. 6, in which the inter-pane space was filled with a gaseous medium consisting of 25% $CCl_2F_2$ and 75% air. The results observed were:

$Cg = 73\%$ Ca
$R_w = I_a = 44$ dB
$f_R = 125$Hz
$L = 28$ dB
$K = 2.34$

Thus it will be seen that this panel gives good results both for thermal and acoustic insulation.

The Examples which follow relate to triple glazing panels.

Figure 7:
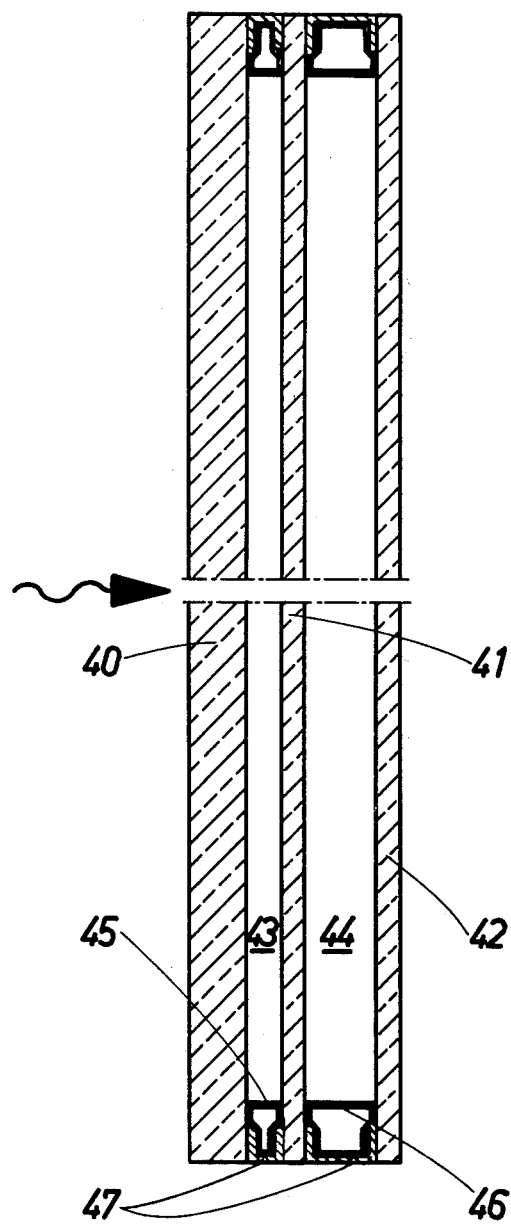
FIG. 7 is a cross-sectional view of a triple glazing panel according to the invention.

FIG. 7 shows a triple glazing unit composed of three glass sheets 40, 41 and 42 respectively 10mm, 4mm and 4mm thick spaced apart by inter-pane spaces 43 and 44, respectively 6mm and 12mm thick and sealed from each other and from the atmosphere by box-section spacer members 45 and 46 secured between the sheets by adhesive 47. It will be observed that the mass of the first sheet is 2.5 times that of either of the other sheets and that one inter-pane space is twice as wide as the other.

Test Panel 14

An air-filled triple glazing panel was constructed in accordance with FIG. 7 for comparison purposes. The sound transmission loss through this panel is of the order of 40 dB. When plotting a graph of incident sound frequency against sound transmission loss through the panel it is found that there are two resonance transmission peaks. These occur at $f_R = 200$Hz. and $f_R' = 315$Hz.

EXAMPLE 37

The thinner inter-pane space 43 of Test Panel 14 was filled with a mixture of 5% $SF_6$ and 95% air (Cg lower than Ca) and the thicker inter-pane space 44 was filled with helium ($Cg = 290\%$ Ca). For this panel the sound transmission loss was $R_w = I_a = 50$ dB. It was found that the lower resonance transmission peak frequency was shifted to 125Hz while $f_R'$ remained substantially the same as for air-filled Test Panel 14.

Figure 8:
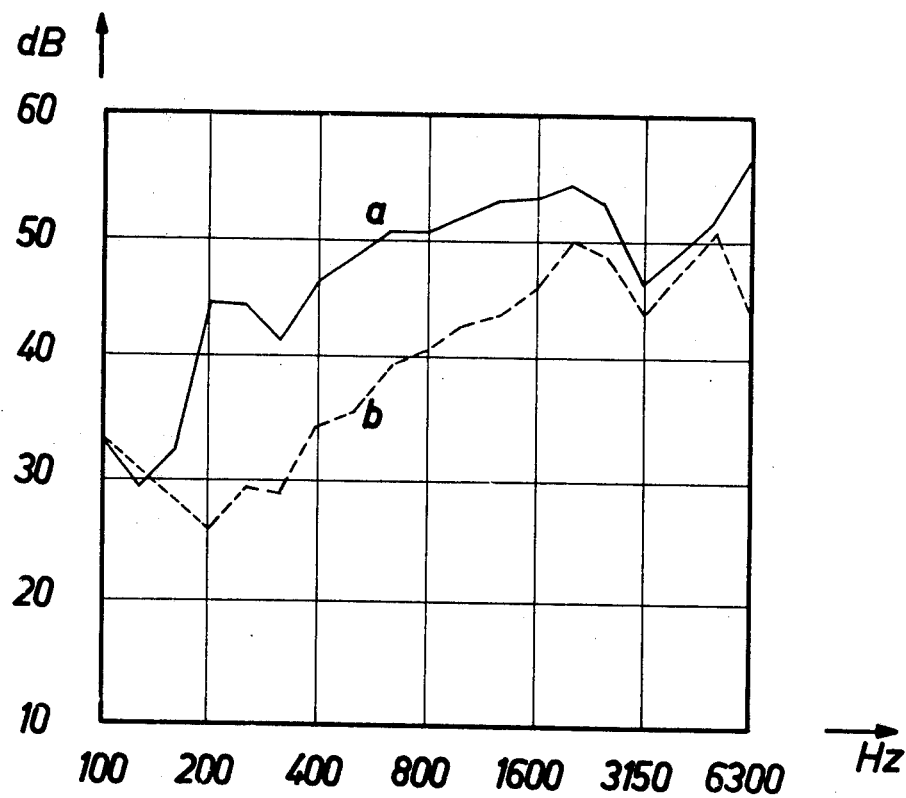
FIG. 8 is a graph of sound transmission loss through triple glazing panels plotted against the frequency of incident sound waves.

FIG. 8 is a graph showing sound transmission loss through a panel plotted against various frequencies of incident sound. Curve $b$ of FIG. 8 relates to air-filled Test Panel 14 and curve $a$ to the panel of Example 37. It will be noted that above the lower resonance transmission peak frequency for the panel of Example 37, that panel gives a marked improvement in sound transmission loss as compared with Test Panel 14 at substantially all audible frequencies, and particularly over the range of resonance frequencies.

EXAMPLE 38

A panel was constructed in accordance with FIG. 7 in which the thinner inter-pane space 43 was filled with $SF_6$ and the thicker space 44 was filled with helium. As has been stated above, for $SF_6$, $Cg = 39\%$ Ca; and for helium, $Cg = 290\%$ Ca. For this panel, the lower resonance transmission peak frequency was displaced from 200Hz to 160Hz, and the sound transmission loss $R_w$ was found to be 46 dB.

EXAMPLE 39

A panel was constructed in accordance with FIG. 7 in which both inter-pane spaces were filled with helium. For this panel it was found that $R_w = 47$ dB.

EXAMPLE 40

A panel was constructed in accordance with FIG. 7 in which the thinner inter-pane space 43 was filled with a mixture of 95% $SF_6$ and 5% He and the thicker space 44 was filled with a mixture of 5% $SF_6$ and 95% He. The sound transmission loss $R_w$ was found to be 46 dB.

Figure 9:
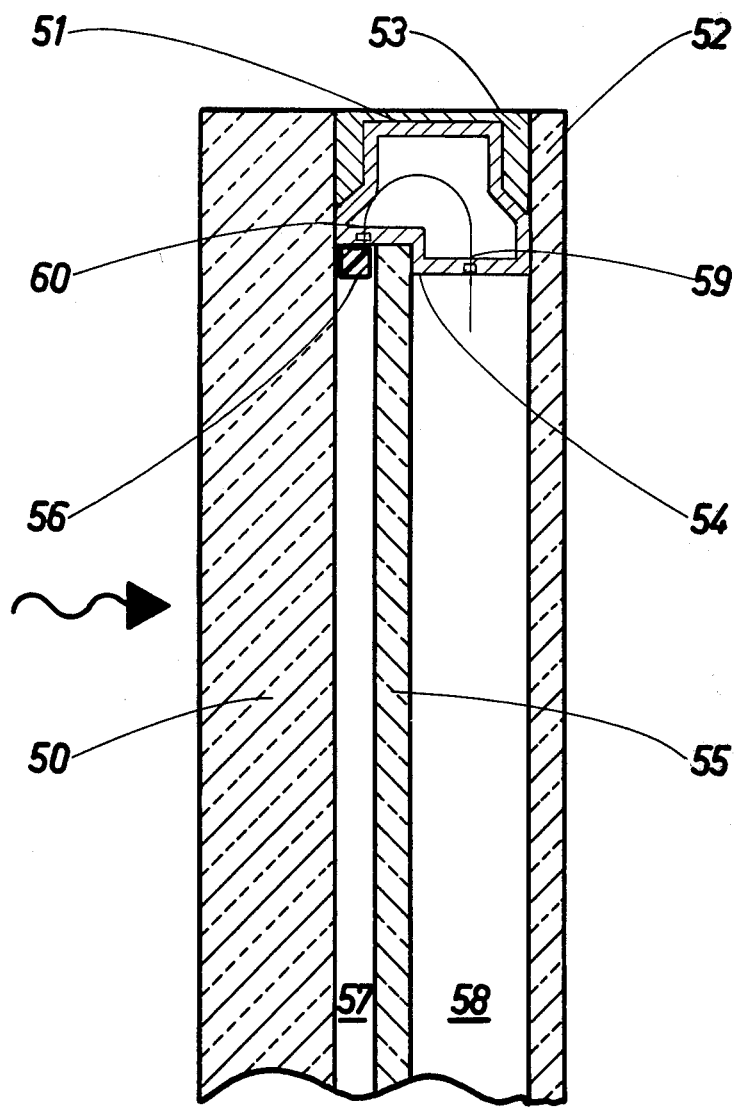
FIGS. 9 and 10 are cross-sectional views of two further triple glazing panels according to the invention.

Other triple glazing panels according to the invention can be constructed in the form shown in FIG. 9. The panel shown includes a first pane 50 constituted by a sheet of glass 10mm thick which is attached by a box-section spacer member 51 to a second pane of glass 52 which is 4mm thick. The spacer member 51 is secured to the first and second panes by adhesive 53, and is shaped to provide a shoulder 54 against which an intermediate pane of glass 55, also 4mm thick, is held by a spacer 56, e.g. of butyl rubber. The inter-pane spaces 57 and 58, respectively, between the first and intermediate panes 50 and 55 and between the intermediate and second panes 55 and 52 are placed into communication with one another by holes 59 and 60 in the spacer member 51.

EXAMPLE 41

A triple glazing panel was constructed in accordance with FIG. 9 and its interior was filled with 33% $CO_2$ and 67% air. The inter-pane spaces 57 and 58 were 2.5mm and 9.5mm thick, respectively. This panel was tested with the sound incident on its thinner exterior sheet 52. It was found that $R_w = I_a = 41$ dB as opposed to 39 dB for a corresponding air-filled panel. The improvement in sound transmission loss afforded by this panel was particularly noticeable in the range of resonance frequencies.

Test Panel 15

The panel of Example 41 was modified by increasing the thicker inter-pane space to be greater than 11mm while keeping the same total inter-pane spacing. This panel was air-filled, and it was found that $R_w = 41$ dB when the panel was tested with the sound incident on its thicker exterior sheet 50 as shown by the arrow in FIG. 9.

EXAMPLE 42

Test Panel 15 was filled with $CCl_2F_2$ and it was found that $I_a = 42$ dB and $R_w = 44$ dB.

EXAMPLE 43

Test Panel 15 was filled with a mixture of 58% $CCl_2F_2$ and 42% air, and it was found that:
$Cg + 56\%$ Ca
$R_w = 47$ dB
$I_a = 45$ dB This shows that an increase in sound transmission loss can be achieved by using a gaseous medium which in part consists of air.

EXAMPLE 44

Test Panel 15 was filled with a mixture of 50% $SF_6$ and 50% air. It was found that $R_w = I_a = 45$ dB.

The use of a pure gas in the inter-pane spaces of a panel according to FIG. 9 displaces the lower resonance transmission peak to a lower frequency, but at the same time transmission loss of the lower resonance peak frequency is reduced, in comparison with a correspondingly dimensioned air-filled panel. By mixing such a pure gas with air, however, it is possible to reduce the effects of a resonance transmission peak.

Test Panel 16

An air-filled triple glazing panel was constructed in accordance with FIG. 9 with the modification that the spacer member 51 was reversed to hold the intermediate pane 55 closer to the thinner exterior pane 52 than to the thicker pane 50. The thicker inter-pane space between the thicker pane 50 and the intermediate pane 55 was 9.5mm and the thinner space was 2.5mm. When tested, with sound incident on the thicker exterior sheet as indicated by the arrow in FIG. 9, the sound transmission loss was found to be $R_w = 39$ dB.

EXAMPLE 45

Test Panel 16 was filled with $SF_6$ and similarly tested. It was found that the sound transmission loss was $R_w = I_a = 41$ dB.

EXAMPLE 46

Test Panel 16 was filled with a mixture of 19% $SF_6$ and 81% air. It was found that $R_w = I_a = 42$ dB.

EXAMPLE 47

The panels of Examples 45 and 46 were modified by increasing the thicker inter-pane space to over 11mm while decreasing the thickness of the thinner inter-pane space so that the total inter-pane space thickness remained the same at 12mm. In each case an improvement in $R_w$ of approximately 1 db was achieved.

EXAMPLE 48

Figure 10:
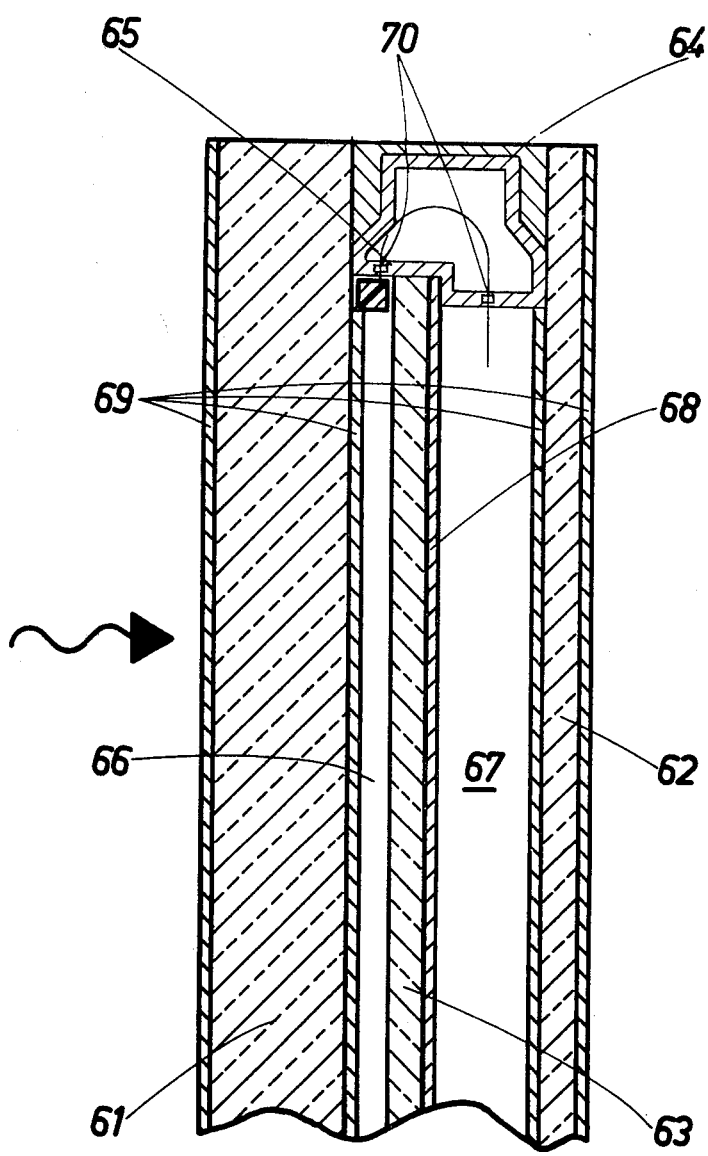

A panel according to the invention which gives particularly good results as regards both its acoustic and its thermal properties may be constructed as shown in FIG. 10. This panel includes three sheets of glass 61, 62 and 63 held in spaced relation by a box-section spacer member 64 glued to the sheets 61 and 62. The spacer member 64 is shaped with a recess 65 having a shoulder against which the intermediate sheet 63 is held, in the manner described with reference to FIG. 9. A thin inter-pane space 66 between the sheets 61 and 63 is in communication with a thicker inter-pane space 67 via holes 70 in the spacer member 64. The intermediate sheet 63 carries, on its face bounding the larger inter-pane space 67, a coating 68 which is adapted to reflect infra-red radiation. Such coating could for example be of copper, gold or tin oxide. Each face of the other sheets 61 and 62 bears a coating 69 which is adapted to cut down visible light reflection. These coatings 69 could for example be of titanium oxide or silicon dioxide, and they have the effect of increasing light transmission, and of avoiding double images when viewing through the panel. Of course other combinations of coatings are also possible, as are other coating materials.

A panel constructed in accordance with FIG. 10 may be filled with any suitable gaseous medium, for example a gaseous medium as specified in any one of Examples 41 to 47. If a gaseous medium as specified in one of those Examples is used, and the panel of the present Example is constructed to the same dimensions as the panel of the respective previous Example, it will be found that the sound transmission loss afforded by tha panel according to this Example is very similar.

In a variant, both faces of the intermediate sheet 63 are covered with an infra-red reflecting coating. In another variant, one of the anti-reflection coatings 69 is replaced by an infra-red reflecting coating. In a further variant, the two inter-pane spaces are isolated from one another and can than be filled with respectively different gaseous media. For example a medium in which Cg is less than Ca could be introduced into the smaller inter-pane space 66 to confer good thermal properties on the panel while a medium in which Cg is greater than Ca could be introduced into the larger inter-pane space 67 to give good sound transmission loss. In particular, the inter-pane spaces may be filled with gaseous media as specified in one of Examples 37, 38 and 40, and for a similarly dimensioned panel, similar sound transmission loss will be afforded.

It will be appreciated that any of the Examples herein set forth can be modified, for example by using a different gaseous medium, especially a gaseous medium as set forth in one of the other Examples, and that any of the panels described with reference to FIGS. 1, 4, 5, 6, 7 and 9 can be given one or more sheet face coatings, e.g. a coating as described in Example 48.

Furthermore it will be appreciated that a desiccant can be introduced into the or each inter-pane space of the panel described in any of the Examples. This can very conveniently be done by using a box-section spacer member as described with reference to any of FIGS. 4, 7, 9 and 10, in which one or more holes or a groove is or are formed in the spacer member so that its interior communicates with its associated inter-pane space. The desiccant can then be contained within the spacer member.

It will also be appreciated that the interior face of a spacer member can be covered with a sound deadening material such as felt. This can have a particularly beneficial effect on the resonance transmission peak, especially when the gaseous medium used is one in which the velocity of sound propagation is lower than in air.

It will be understood that the above description of the present invention is susceptible to various modifications, changes and adaptations, and the same are intended to be comprehended within the meaning and range of equivalents of the appended claims.

What is claimed is:

1. In a light transmitting panel composed of at least two panes and spacer means holding the panes in spaced relation to define an inter-pane space between adjacent panes, the improvement wherein, for imparting improved sound damping properties to said panel, at least two said panes have respectively different masses per unit light transmitting surface area, said inter-pane space is sealed from the atmosphere, and said panel comprises a gaseous medium filling said space and having a composition such that the velocity of sound propagation in said gaseous medium is at least 1.2 times the velocity of sound propagation in dry air at the same pressure and temperature.

2. A panel as defined in claim 1 wherein said inter-pane space is at least 9mm thick.

3. A panel as defined in claim 1 wherein said gaseous medium comprises at least one gas selected from among helium (He), neon (Ne), methane ($CH_4$), and hydrogen ($H_2$).

4. A panel as defined in claim 3 wherein said gaseous medium comprises a mixture which consists of between 80% and 85% helium (He), the balance being methane ($CH_4$).

5. A panel as defined in claim 1 wherein said gaseous medium is composed in part of a gas mixture having the composition of air.

6. A panel as defined in claim 1 wherein one of said panes has a mass per unit light transmitting surface area which is at least 1.2 times as great as that of another one of said panes.

7. A panel as defined in claim 6 wherein said one of said panes has a mass per unit light transmitting surface area which is at least 1.2 times as great as that of each other one of said panes.

8. A panel as defined in claim 6 wherein said one of said panes has a mass per unit light transmitting surface area at most equal to three times the mass per unit light transmitting surface area of that one of said panes having the lowest such mass.

9. A panel as defined in claim 1 further comprising a desiccant in communication with said space and composed of a material selected from among calcium sulphate ($CaSO_4$); calcium chloride ($CaCl_2$); calcium hydride ($CaH_2$); diphosphorus pentoxide ($P_2O_5$); and a molecular sieve with pores smaller or equal to 4 A.

10. A panel as defined in claim 1 wherein at least one of said panes is in the form of a laminate.

11. A panel as defined in claim 1 further comprising a metal or oxide coating on at least one pane surface which bounds said space.

12. A panel as defined in claim 1 wherein there are three said panes held by said spacer means so as to define two said inter-pane spaces sealed from the atmospheric and of respectively different thicknesses, at least one of said spaces being filled with said medium having said composition.

13. In a light transmitting panel composed of at least two panes and spacer means holding the panes in spaced relation to define an inter-pane space between adjacent panes, the improvement wherein, for imparting improved sound damping properties to said panel, at least two said panes have respectively different masses per unit light transmitting surface area, said inter-pane space is sealed from the atmosphere, and said panel comprises a gaseous medium filling said space and having a composition such that the velocity of sound propagation in said gaseous medium is between 30% and 95% of the velocity of sound propagation in dry air at the same pressure and temperature.

14. A panel as defined in claim 13 wherein said inter-pane space is at least 9mm thick.

15. A panel as defined in claim 13 wherein the composition of said medium is such that the velocity of sound propagation in said gaseous medium is between 35% and 75% of the velocity of sound propagation in dry air at the same pressure and temperature.

16. A panel as defined in claim 13 wherein said gaseous medium is composed in part of a gas mixture having the composition of air.

17. A panel as defined in claim 13 wherein said gaseous medium comprises sulphur hexafluoride ($SF_6$).

18. A panel as defined in claim 13 wherein said gaseous medium comprises at least one gas chosen from among dichlorodifluoromethane ($CCl_2F_2$), carbon dioxide ($CO_2$), argon (Ar), butane ($C_4H_{10}$), nitrous oxide ($N_2O$), and chloropentafluoroethane ($C_2ClF_5$).

19. A panel as defined in claim 18 wherein said gaseous medium further comprises sulphur hexafluoride ($SF_6$).

20. A panel as defined in claim 13 wherein said gaseous medium comprises a mixture of sulphur hexafloride ($SF_6$) and argon (Ar).

21. A panel as defined in claim 13 wherein said gaseous medium is composed in part of a gas mixture having the composition of air.

22. A panel as defined in claim 13 wherein one of said panes has a mass per unit light transmitting surface area which is at least 1.2 times as great as that of another one of said panes.

23. A panel as defined in claim 22 wherein said one of said panes has a mass per unit light transmitting surface area which is at least 1.2 times as great as that of each other one of said panes.

24. A panel as defined in claim 22 wherein said one of said panes has a mass per unit light transmitting surface area at most equal to three times the mass per unit light transmitting surface area of that one of said panes having the lowest such mass.

25. A panel as defined in claim 13 wherein there are three said panes held by said spacer means so as to define two said inter-pane spaces sealed from the atmosphere and of respectively different thicknesses, at least one of said spaces being filled with said medium having said composition.

26. A panel as defined in claim 13 further comprising a desiccant in communication with said space and composed of a material selected from among calcium sulphate ($CaSO_4$); calcium chloride ($CaCl_2$); calcium hydride ($CaH_2$); diphosphorus pentoxide ($P_2O_5$); and a molecular sieve with pores smaller or equal to A.

27. A panel as defined in claim 13 wherein at least one of said panes is in the form of a laminate.

28. A panel as defined in claim 13 further comprising a metal or oxide coating on at least one pane surface which bounds said space.

29. In a light transmitting panel composed of three panes and spacer means holding the panes in spaced relation to define two inter-pane spaces each between a respective pair of adjacent panes, the improvement wherein for imparting improved sound damping properties to said panel, at least two said panes have respectively different masses per unit light transmitting surface area, each said inter-pane space is sealed from the atmosphere, and said panel comprises a respective gaseous medium filling each said space, the composition of the gaseous medium in one said space being such that the velocity of sound propagation therein at a given temperature and pressure is between 30 and 95% of that in dry air at the same pressure and temperature and the composition of the gaseous medium in the other said space being such that the velocity of sound propagation therein at a given temperature and pressure is at least 1.2 times that in dry air at the same pressure and temperature.

30. A panel as defined in claim 29 wherein said inter-pane spaces are of respectively different thicknesses.

31. A panel as defined in claim 30 wherein the thinner of said two spaces constitutes said one space and the thicker of said two spaces constitutes said other space.

32. A panel as defined in claim 3, wherein the thicker space is at least twice as thick as the thinner space.

33. A panel as defined in claim 30 wherein the thicker space is at least twice as thick as the thinner space.

34. In a light transmitting panel composed of at least two panes and spacer means holding the panes in spaced relation to define an inter-pane sapce between adjacent panes, the improvement wherein, for imparting improved sound damping properties to said panel, at least two said panes have respectively different masses per unit light transmitting surface area, and said inter-pane space is sealed from the atmosphere, and said panel comprises a gaseous medium filling said space and composed of two ingredients, the composition of one of said ingredients being such that the velocity of sound propagation therein at a given temperature and pressure is at least 1.2 times the velocity of sound propagation in dry air at the same pressure and temperature, and the composition of the other one of said ingredients being such that the velocity of sound propagation therein at a given temperature and pressure is between 30 and 95% of the velocity of sound propagation in dry air at the same pressure and temperature.

* * * * *